United States Patent [19]

Kim et al.

[11] Patent Number: 5,468,328
[45] Date of Patent: Nov. 21, 1995

[54] TIRE MOLDER SHOULDER BLADDER

[75] Inventors: Chun-Sik Kim; Young-Rok Yoon; Seong-keun Kim, all of Kwangju, Rep. of Korea

[73] Assignee: Kumho & Co., Inc., Seoul, Rep. of Korea

[21] Appl. No.: 266,086

[22] Filed: Jun. 24, 1994

Related U.S. Application Data

[62] Division of Ser. No. 897,130, Jun. 11, 1992, Pat. No. 5,324,375.

[30] Foreign Application Priority Data

Jun. 11, 1991 [KR] Rep. of Korea .................. 9599/1991
Jun. 27, 1991 [KR] Rep. of Korea ................ 10808/1991

[51] Int. Cl.[6] ........................................... B29D 30/18
[52] U.S. Cl. ........................................ 156/401; 156/394.1
[58] Field of Search ............................... 156/394.1, 401, 156/416; 264/315; 425/31, 43, 45, 48, 52, 389, 390

[56] References Cited

U.S. PATENT DOCUMENTS 4,093,014 6/1978 Tomoda et al. .................. 152/542

*Primary Examiner*—Michael W. Ball
*Assistant Examiner*—Richard Crispino
*Attorney, Agent, or Firm*—Lowe, Price, LeBlanc & Becker

[57] ABSTRACT

A shoulder bladder used to make green tires has an inflatable portion including an inner-rubber member encased in body-ply and cover-rubber layers. Steel cords fixedly mounted relative to and projecting away from the cover-rubber layer have a first edge close to a lower corner of the uninflated bladder and approximately aligned with aligned ends of the cover-rubber and body ply layers. A cord-rubber composition extends (a) from and is adhered to a bottom portion of the cover-rubber layer, (b) around and adhered to the steel cords, (c) around two aligned corners on lower and upper surfaces of the bladder, and (d) along a top surface of the cover-rubber layer. The cord-rubber composition is adhered to the cover-rubber layer where the cord-rubber composition extends from the steel cord to the top surface of the cover-rubber layer.

2 Claims, 6 Drawing Sheets

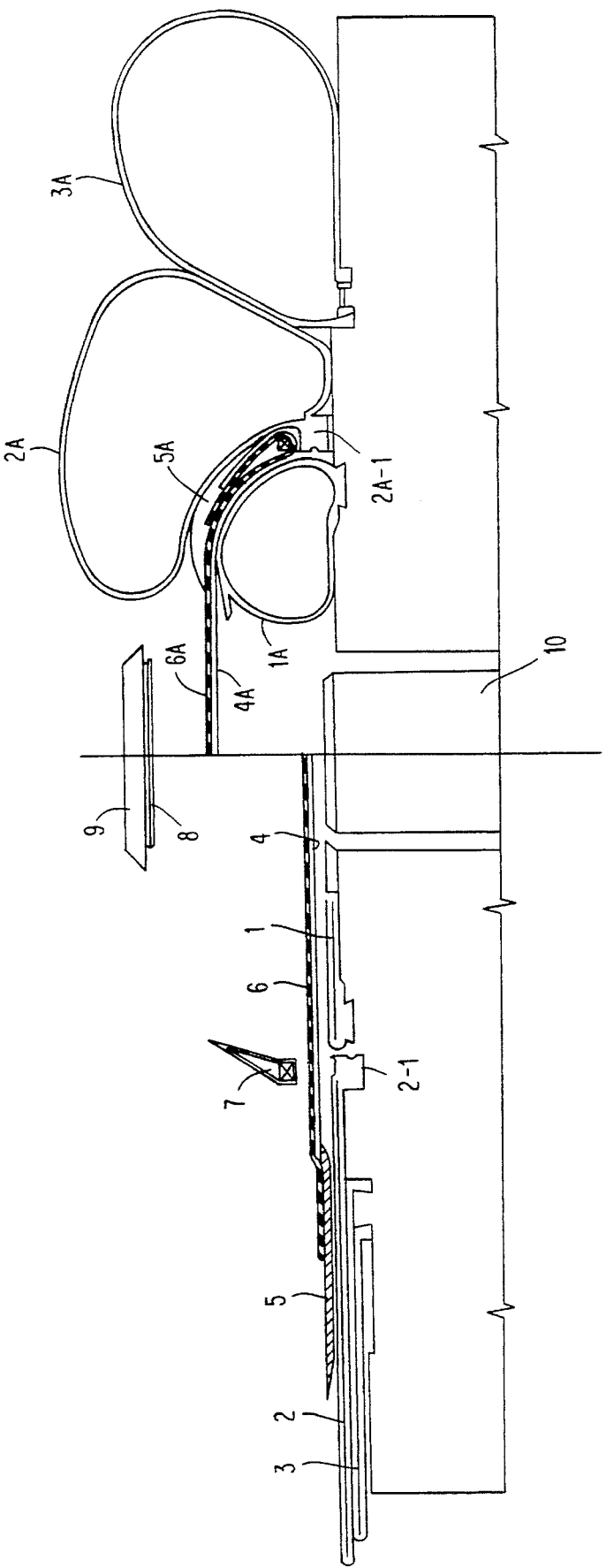

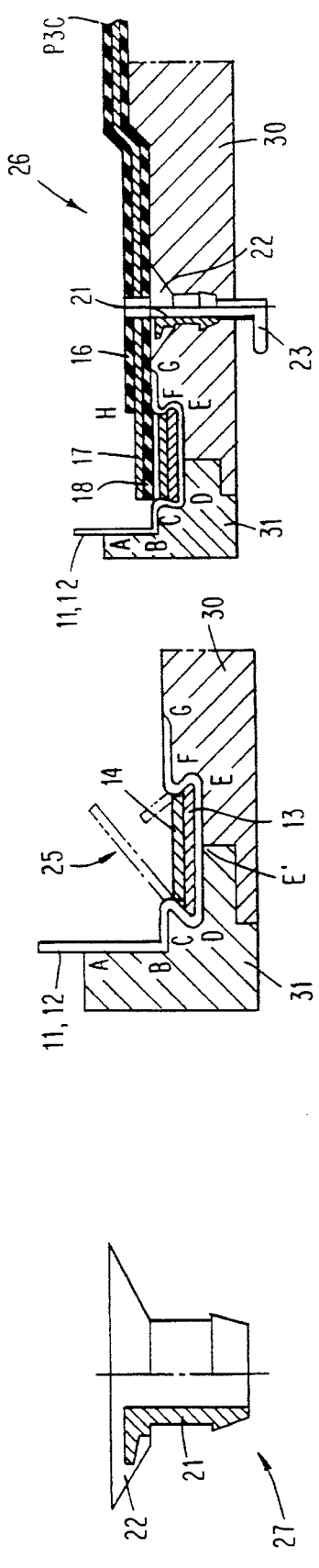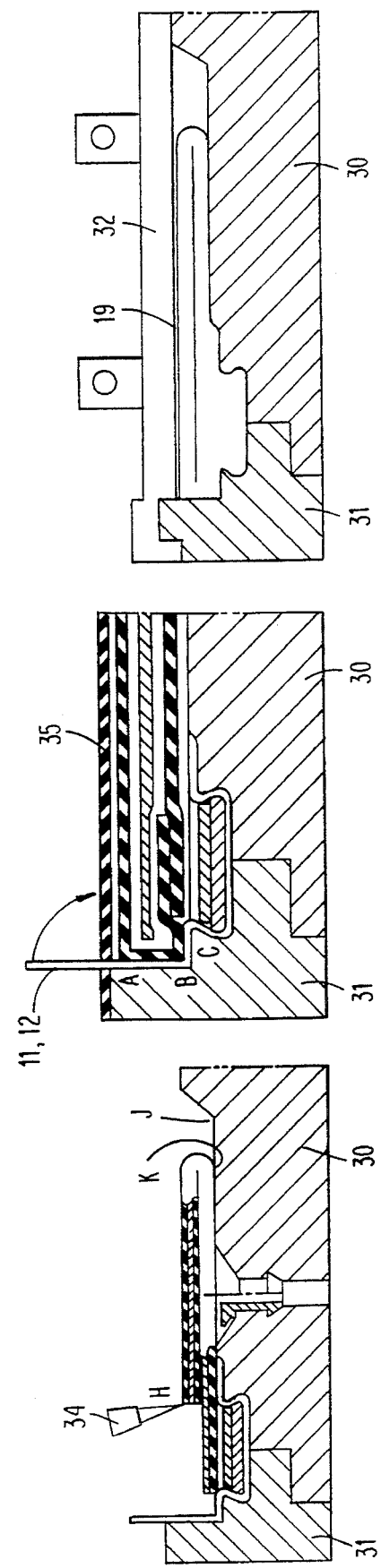

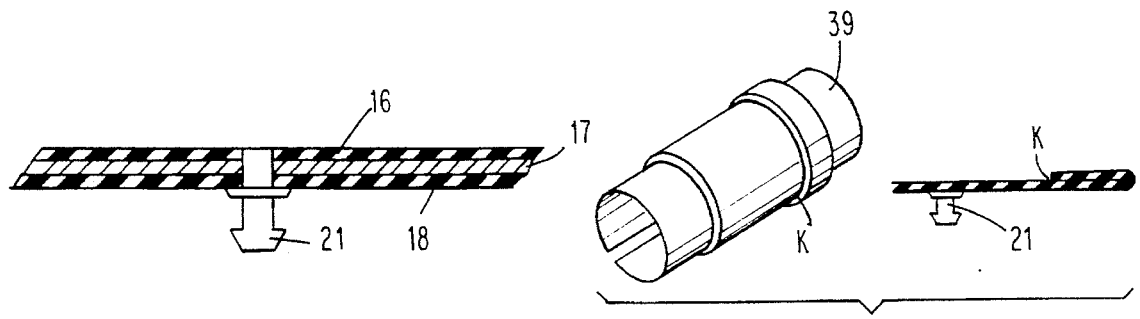
FIG. 5(a) PRIOR ART
FIG. 5(b) PRIOR ART
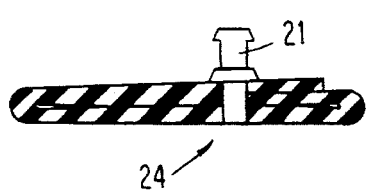
FIG. 5(c) PRIOR ART
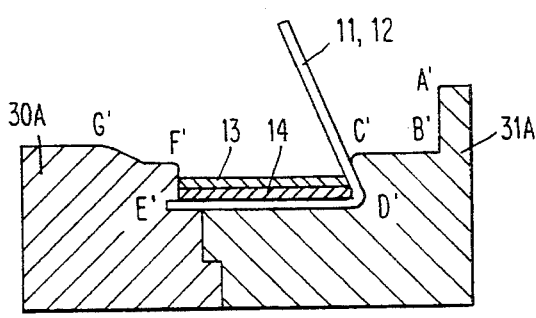
FIG. 5(d) PRIOR ART
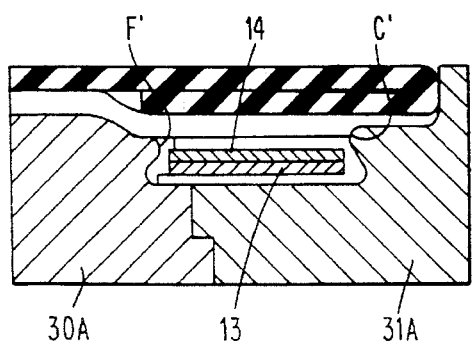
FIG. 5(e) PRIOR ART
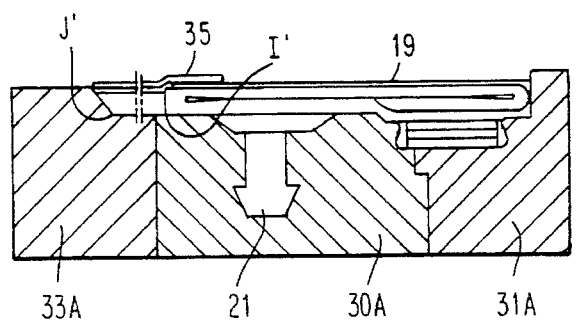
FIG. 5(f) PRIOR ART 5,468,328

TIRE MOLDER SHOULDER BLADDER

The present application is a division of application Ser. No. 07/897,130 filed Jun. 11, 1992, now U.S. Pat. No. 5,324,375.

TECHNICAL FIELD

The present invention relates generally to a tire molder shoulder bladder used in making tires and more particularly to a shoulder bladder including a cord-rubber sheet of a first pocket wrapped around body-ply and rubber cover sheets, as well as metal cords, of a second pocket that forms an expandable chamber of the bladder so the first and second pockets are securely bonded to each other.

BACKGROUND ART

As shown in FIGS. 4(a) and 4(b), steel cords 13, 14 forming assembling members CDEF of a shoulder bladder used in making green tires are wrapped with a composition of rubber sheet and cord 11, 12 (hereinafter referred to as a cord-rubber composition) extending along the path defined by points G-F-E-D-C-F. The bladder includes body-ply layer 17, inflatable inner-rubber member 16 and cover-rubber layer 18. Rubber member 16, body-ply layer 17 and rubber layer 18 constitute the expandable part of the bladder which has a joint formed on the upper part thereof, as shown, for example, in FIG. 4(a). This prior bladder is manufactured by the sequential steps of FIGS. 5(a)–(f). The process illustrated in FIGS. 5(a)–(f) for manufacturing the prior bladder is as follows:

Green, uncured inner-rubber member 16, body-ply layer 17 and cover-rubber layer 18 constituting the bladder are adhered to each other in turn as illustrated in FIG. 5(a). End parts of member 16, as well as layers 17 and 18, are cut on the bias to obtain a green product. Valve 27 including stem 21 is bonded to the composite structure formed by inner rubber member 16 and layers 17 and 18, as illustrated in FIG. 5(a). One end of the slanted part of the green product is folded back on bending machine 39 to reach line K of machine 39, FIG. 5(b). Bonded stem 21 of valve 27 is folded so valve 27 of the green product extends outward for adhesion to line K to form pocket 24, FIG. 5(c).

In assembling the bladder portion extending between points CDEF, FIGS. 4(a) and 4(b), cord-rubber compositions 11, 12 and steel cords 13, 14 are inserted into a cavity defined by points C'D'E'F' of body drum 30A and outer drum 31A, FIG. 5(d). Pocket 24 is turned out so valve 27 faces inward. Then parts 11–14 are inserted into body drum 30A and outer drum 31A (FIG. 5(d)) so the portion of the bladder between points C–F abuts the portions of drums 30A and 31A between points C'F'. Ring 33A is assembled thereto, as illustrated in FIG. 5(f). Rubber end portion 20 of the bladder (as illustrated in FIG. 2) abuts rubber end portion I'J', FIG. 5(f), of a folded portion of pocket 24. The surface of woven fabric 19 is wrapped to the proper width by inner tube 37. Then 140° C.–160° C. steam is injected to cure the green bladder.

However, the shoulder bladder manufactured by the method as described above has many defects, as follows:

First, since the portion of the bladder formed by metal cords 13, 14 is wrapped only by cord-rubber composition 11, 12, repeated expansion and deflation of the bladder during tire manufacturing frequently causes cracks and separation in the vicinity of point C', where stress is most cumulative. As shown in FIG. 1(b), inflation of shoulder bladder 1A while tire bead parts are formed and belt 8 is adhered to tread 9 causes air frequently to leak out through the separate portions of the bladder. Thereby, the position of a center line of a green tire before bladder inflation frequently differs from a center line of a manufactured green tire so there is poor adhesion of belt 8 and tread 9, resulting in a tire having poor uniformity.

The air leakage of the prior art bladder is frequently so slight that workers do not become aware of the fine crack and separation at point C of the bladder when the green tire is manufactured. The resulting tire thus frequently has an inferior rating and tire quality is greatly reduced.

Second, since the joint of the bladder body ply is disposed on the upper of the body ply, the expansion state of the bladder has a position as illustrated by dotted line 1'—1, FIG. 1(b). When the bead portion of the green tire is manufactured, the supporting force of the bladder from the interior of the bladder is fragile. Thereby a large quantity of air can get in through each position of the end portion 6A-1 of body ply 6A and a bead hump, causing great degradation to the tire quality. Furthermore, when belt 8 and tread 9 are adhered to the green tire, there is an increased probability of off-center adhesion due to the fragile supporting force of the bladder. This causes reduced tire quality and uniformity.

Third, since connection positions of the intermediate product formed of inner-rubber member 16, body-ply layer 17 and cover-rubber layer 18 constituting the bladder are only at one portion of an expanded tire circumference, the tire radius is not uniform.

Fourth, due to simultaneous curing of the surface of the bladder and the inner tube, when the inner tube is wound, a center portion in the transverse direction expands more than both ends during curing. The extent of expansion is determined by the differences of winding numbers and tension depending on each part in the transverse direction or each location along the bladder circumference. Thus, it is difficult for a bladder having equivalent transverse and circumferential dimensions to be manufactured because of dimensional variations of each bladder portion; the surface thereof can not be manufactured smoothly.

Accordingly, when a tire is manufactured by means of the molder utilizing the bladder obtained by the method described above, all qualities thereof, especially uniformity, are considerably reduced. This is because the tire quality depends on the dimensional deviations of the bladder assembled by the molder.

It is an object of the present invention to provide a new and improved tire molder shoulder bladder and more particularly to a bladder having a structure to overcome the defects of point C of the prior art occurring mostly due to cumulation of stress when the shoulder bladder is repeatedly expanded and deflated.

A further object is to provide a new and improved tire molder shoulder bladder capable of improving the quality of the tire and providing extended useful life thereof.

An additional object of the invention is to provide a new and improved tire molder shoulder bladder designed to prevent leakage of air filled in a green tire and to maintain pressure of the filled air during manufacture of the tire.

Another object of the invention is to provide a new and improved tire molder shoulder bladder used for making tires including one or more layers of radially disposed body-ply cords and two or more circumferential belts.

DISCLOSURE OF THE INVENTION

A shoulder bladder for use in manufacture of green tires comprises an inner-rubber member forming an inflatable portion of the bladder. The inner-rubber member is encased in body-ply and cover-rubber layers, the inner-rubber member, body-ply and cover-rubber layers extending longitudinally while the inner-rubber member is uninflated so that in proximity to a lower corner of the bladder while the rubber member is uninflated there are overlapping portions of opposite ends of the body-ply layer. One end of the cover-rubber layer is aligned with the end of the body-ply layer closest to the lower corner while the rubber member is uninflated. The other end of the cover-rubber layer is somewhat close to an upper corner of the bladder while the rubber member is uninflated. The upper and lower corners are substantially aligned while the rubber member is uninflated. Steel cord means fixedly mounted relative to and projecting away from the cover-rubber layer have a first edge close to the lower corner that is approximately aligned with the aligned ends of the cover-rubber and body ply layers. A cord-rubber composition that is around and adhered to the steel cord means extends from and is adhered to a bottom portion of the cover-rubber layer. The cord-rubber composition also extends around both of said corners, and along the body ply layer and extends next to the cover-rubber layer. The cord-rubber composition is adhered to the cover-rubber layer where the cord-rubber composition extends from the steel cord means to the top surface of the cover-rubber layer.

Preferably, the shoulder bladder includes a layer of woven fabric bonded to the upper surfaces of the cover-rubber layer and the cord-rubber composition.

BRIEF DESCRIPTION OF DRAWINGS

FIG. 1(a), on the left side of the Figure, is a longitudinal sectional view of a green tire molder including three uninflated bladders and, on the right side of the figure, is a mirror image of the structure on the left side with three inflated bladders during molding of a tire bead portion;

FIGS. 3(a)–(f) are schematic diagrams of steps for manufacturing the bladder of FIG. 2;

FIGS. 5(a)–(f) are schematic diagrams of steps for manufacturing the prior art bladder of FIGS. 4(a) and (b).

DETAILED DESCRIPTION OF THE PRESENT INVENTION

Figure 2:
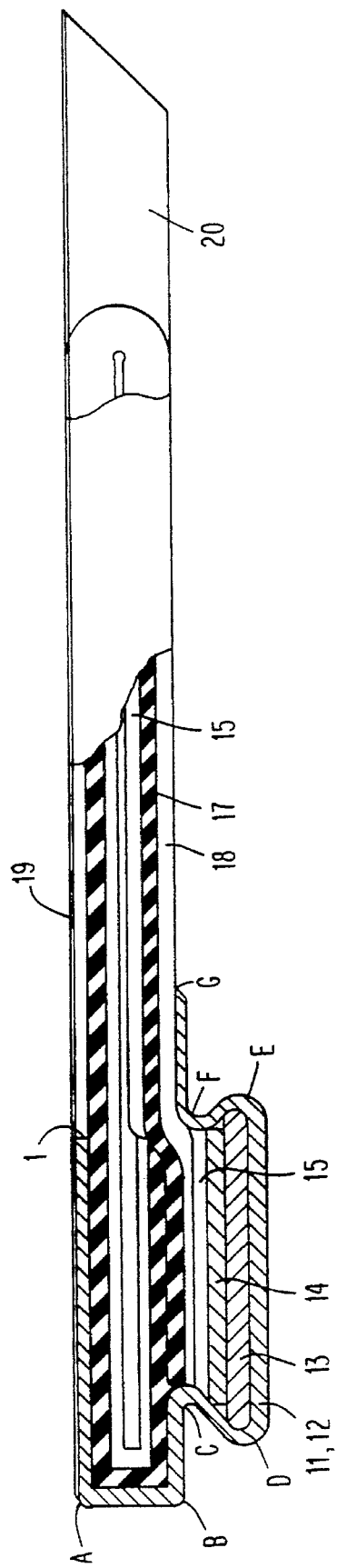
FIG. 2 is a longitudinal sectional view of an uninflated shoulder bladder in accordance with the present invention.
Figure 4A:
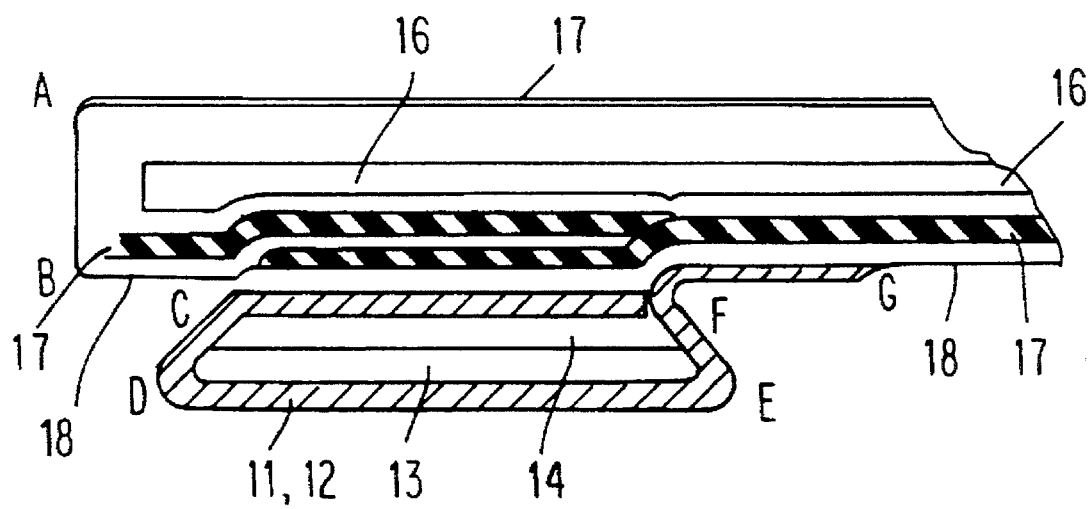
FIGS. 4(a) and (b) are longitudinal sectional views of a prior art shoulder bladder.
Figure 4B:
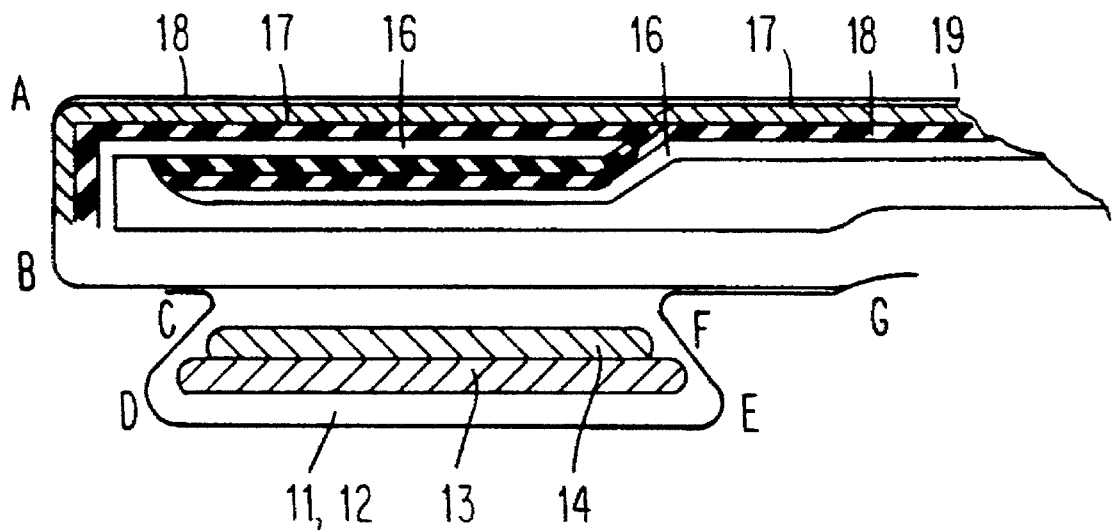

Referring to the accompanying drawings, the shoulder bladder is illustrated in FIG. 2 as including inner-rubber member 16 forming the inflatable or expandable part of the bladder, encased by body-ply layer 17 and cover-rubber layer 18. Members 16–18 are cut to the required length, are spread at regular intervals on the circumference of a bender similar to prior art bender 39 (FIG. 5), are abutted against the circumference of the bender and then are adhered together to form pocket 26, FIG. 3(c).

Cover drum 32, FIG. 3(f), is placed on an exposed upper surface of the bladder formed by members 16–18; the bladder is cured by injecting air at about 3.5–6.5 Kg/cm of pressure into member 16. During curing of the bladder, each part of the width and circumference is pushed equally so each part has a uniform gauge dimension necessary for the design.

Pocket 26 of the bladder is cut to the required length, is spread at regular intervals on the circumference of bender 39 and is inserted on body drum 30. Then prepared valve union 23 is assembled in the screw part of valve stem 21; the opposite end P3C, FIG. 3(c), of base surface C of pocket 26 is fixed to a defined point H by an awl and pushed to a line defined by points ABC of outer drum 31 to form the bladder cross-sectional diameter.

After cement coated on the bladder surface dries, a nylon portion of woven fabric 19 (FIG. 2) treated with adhesive is bonded to cover-rubber layer 18. Then cover drum 32 is placed on the surface of the bladder as described above. The bladder including members 16–18 is cured by injecting compressed air at a pressure of about 3.5–6.5 Kg/cm into the bladder to push the bladder surface toward the surface of cover drum 32. In response to the injected air pressure, woven fabric 19 becomes firmly adhered to cover-rubber layer 18 because the cover-rubber layer and woven fabric are pressed together, causing smooth bladder surface formation.

Referring to FIG. 3, the method of making the shoulder bladder illustrated in FIG. 2 is illustrated in more detail. The bladder-forming steps involve:

(a) Rubber is adhered to valve stem 21 of valve 27 by curing; then the bottom of the base portion of the cured rubber surface is buffed.

(b) Cord-rubber composition 11, 12 is inserted into a recess defined by points CDEF on a bottom face of a cavity (extending between points A and G) of body drum 30, as illustrated in FIG. 3(b). Then steel cord 13, 14 and composition 11, 12 are spread on a bender similar to 39 (FIG. 5) and are adhered to each other to form first pocket 25.

(c) Inner-rubber member 16, superposed on body-ply layer 17, and cover-rubber layer 18 constitutes a structure forming the bladder and are cut to the required length, are spread at regular intervals on the circumference of the bender similar to bender 39 (FIG. 5) and are adhered to each other to form second pocket 26.

(d) Pocket 25 is inserted into the assembling portion of the shoulder bladder, i.e., portion EE' (FIG. 3(b)) of body drum 30, outer drum 31 is assembled thereto, and the cord-rubber composition 11, 12 of pocket 26 is urged against side wall portion AB of outer drum 31.

(e) Pocket 26 is inserted into body drum 30 and prepared valve 27 is adhered to pocket 26 so the valve end portion is positioned at base surface C of outer drum 31.

(f) Prepared valve union 23 (FIG. 3(c)) is assembled to a screw part of valve stem 21 and the opposite end part P3C of base surface C of pocket 26 is folded back to reach line H (FIG. 3(f)); then part P3C is fixed by awl 34. Before pocket 26 is folded back, it is coated with a release agent to prevent adhesion of the upper intermediate products.

(g) Pocket 26 is pushed, i.e., manipulated, toward portion ABC of outer drum 31 so the recess defined by points CDEF is covered thereby. Cord-rubber composition 11, 12 of pocket 25 is folded from its position against side wall AB onto the top surface of the materials forming pocket 2(b), as indicated by the curved arrow of FIG. 3(e), so composition sheet 11, 12 extends from point I on the top face of body-ply 17 all the way around the left side (as viewed in FIG. 2) and bottom face of the body-ply and around the periphery of the materials forming pocket 25 to point G on the bottom face of cover-rubber layer 18 via a path defined by points ABCDEF, FIG. 2. The surface of the green bladder is slightly wrapped with inner tube 35 (FIG. 3(*e*)), while strip rubber 20 (FIG. 2) is adhered to edge portion KJ (FIG. 3(*d*)) of the bladder, i.e., then inner tube 35 is unwrapped.

(h) Cement is coated on the surface of the bladder formed from members 16–18, woven fabric 19 is adhered thereto, and cover drum 32 is placed on the upper surfaces of woven fabric 19, body drum 30 and outer drum 31 (FIG. 3(*f*)).

(i) To cure, a hose (not shown) injects compressed air into the bladder before steam is injected. Air and steam are injected simultaneously to cure the bladder; then the bladder pressure is released, after which cover drum 32 and outer drum 31 are separated.

By using the above-described method of the present invention, the shoulder bladder shown in FIG. 2 is obtained. Hence, the bladder of the present invention for manufacturing a tire includes cover-rubber layer 18, body-ply layer 17, inner-rubber member 16 forming the expandable part, and steel cords 13, 14 forming the assembling part, all of which are wrapped together and held in place by cord-rubber composition 11, 12. More particularly, said components 13, 14, 16, 17 and 18 are wrapped by cord-rubber composition 11, 12 from end G to end I of the cord-rubber layer as indicated by the line defined by points G-F-E-D-C-B-A-I. Cord-rubber composition 11, 12 is positioned at an angle of 90° to the perimeter of the remainder of the bladder.

Figure 1B:
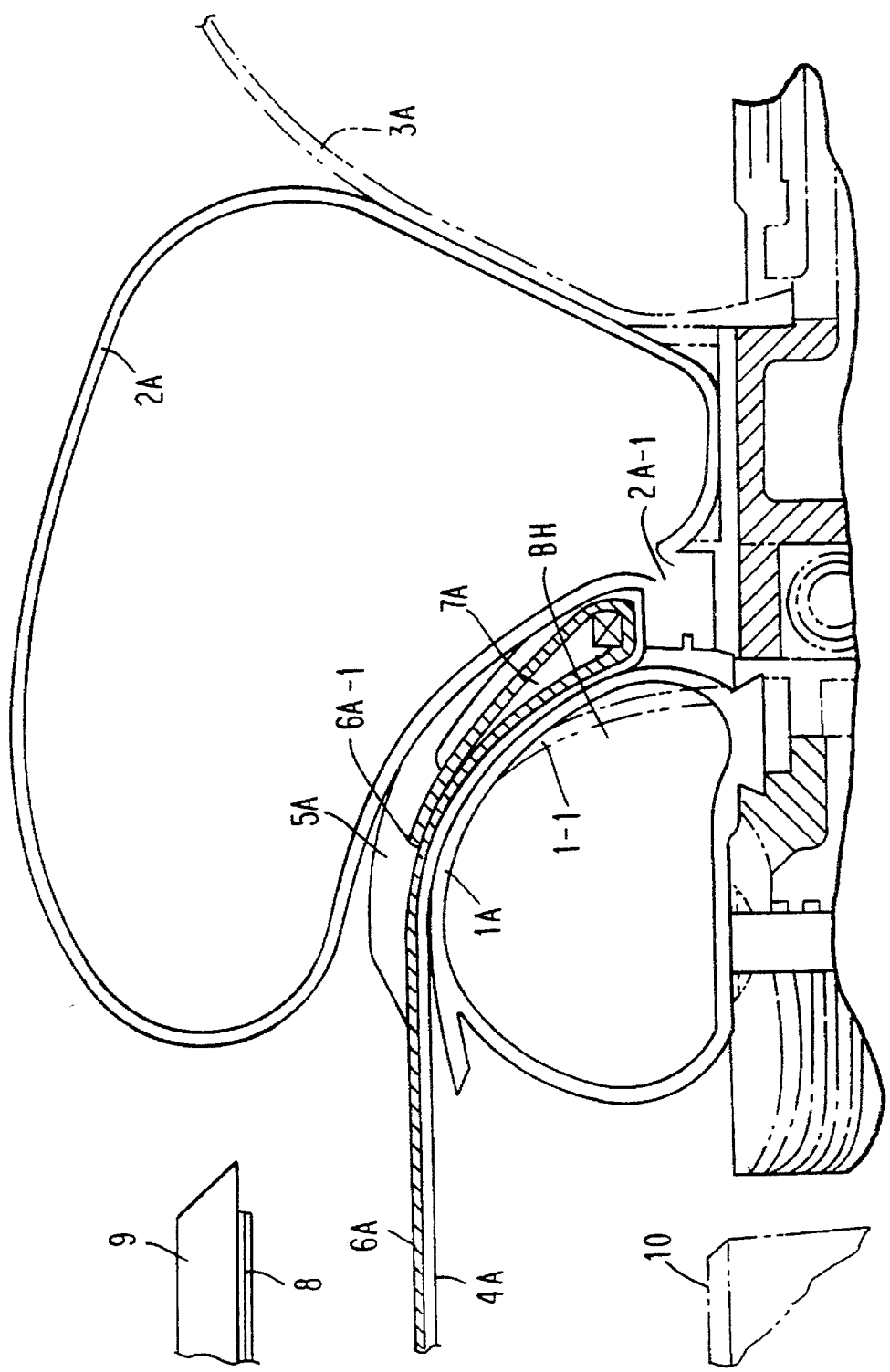
FIG. 1(b) is an exploded longitudinal sectional view of a portion of the structure illustrated in FIG. 1 during molding of a tire bead portion.

When the bladder is expanded in use during manufacture of a tire, it must retain the form shown in 1A of FIGS. 1(*a*) and 1(*b*) so it abuts firmly between bead apex 7A (FIG. 1(*b*)) of each green tire to minimize the amount of air escaping from end portion 6A-1 of body ply 6A and bead hump portion BH.

Accordingly, to retain the bladder as above, the gauge of each position of the bladder must be retained uniformly in advance. Thus, the body-ply joint is positioned at the assembling portion of the uninflated shoulder bladder to be positioned at the assembling portion. Consequently, the new bladder improves the quality and function of the prior tire in accordance with the method of the present invention.

While there has been described and illustrated a specific embodiment of the invention, it will be clear that variations in the details of the embodiment specifically illustrated and described may be made without departing from the true spirit and scope of the invention as defined in the appended claims.

We claim:

1. A shoulder bladder for use in manufacture of green tires comprising an inner-rubber member forming an inflatable portion of the bladder, the inner-rubber member being encased in body-ply and cover-rubber layers, the inner-rubber member, body-ply and cover-rubber layers extending longitudinally while the inner-rubber member is uninflated so that in proximity to a lower corner of the bladder while the rubber member is uninflated there are overlapping portions of opposite ends of the body-ply layer, one end of the cover-rubber layer being aligned with the end of the body-ply layer closest to the lower corner while the rubber member is uninflated, the other end of the cover-rubber layer being near an upper corner of the bladder while the rubber member is uninflated, the upper and lower corners being substantially aligned while the rubber member is uninflated, steel cord means fixedly mounted relative to and projecting away from the cover-rubber layer having a first edge close to the lower corner and approximately aligned with the aligned ends of the cover-rubber and body ply layers; and a cord-rubber composition (a) extending from and adhered to a bottom portion of the cover-rubber layer, (b) around and adhered to the steel cord means, (c) extending around both of said corners, and (d) extending along the body ply layer and ending next to the cover-rubber layer, the cord-rubber composition being adhered to the cover-rubber layer where the cord-rubber composition extends from the steel cord means to the top surface of the cover-rubber layer.

2. The shoulder bladder of claim 1 further including a layer of woven fabric bonded to the upper surfaces of the cover-rubber layer and the cord-rubber composition.

\* \* \* \* \*